(12) United States Patent  
Sanders et al.

(10) Patent No.: US 8,701,172 B2  
(45) Date of Patent: Apr. 15, 2014

(54) SYSTEM AND METHOD FOR FACILITATING USER AUTHENTICATION OF WEB PAGE CONTENT

(75) Inventors: Daniel Sanders, Orem, UT (US); Duane Buss, West Mountain, UT (US)

(73) Assignee: Apple Inc., Cupertino, CA (US)

( * ) Notice: Subject to any disclaimer, the term of this patent is extended or adjusted under 35 U.S.C. 154(b) by 1074 days.

(21) Appl. No.: 12/190,819

(22) Filed: Aug. 13, 2008

(65) Prior Publication Data

US 2010/0043058 A1    Feb. 18, 2010

(51) Int. Cl.
  G06F 7/04    (2006.01)
  G06F 15/16    (2006.01)
  G06F 17/30    (2006.01)
  H04L 29/06    (2006.01)

(52) U.S. Cl.
  USPC .............................................. 726/7; 713/189

(58) Field of Classification Search
  USPC ........................................................... 726/7
  See application file for complete search history.

(56) References Cited

U.S. PATENT DOCUMENTS

| | | | | |
|---|---|---|---|---|
| 7,493,403 B2* | 2/2009 | Shull et al. | | 709/229 |
| 7,660,981 B1* | 2/2010 | Hunt | | 713/156 |
| 7,694,135 B2* | 4/2010 | Rowan et al. | | 713/166 |
| 2005/0149726 A1* | 7/2005 | Joshi et al. | | 713/164 |
| 2005/0187878 A1* | 8/2005 | Khaishgi et al. | | 705/58 |
| 2006/0253583 A1* | 11/2006 | Dixon et al. | | 709/225 |
| 2007/0234217 A1* | 10/2007 | Miller et al. | | 715/738 |
| 2008/0046738 A1* | 2/2008 | Galloway et al. | | 713/176 |
| 2008/0046968 A1* | 2/2008 | Cline et al. | | 726/2 |
| 2008/0109553 A1* | 5/2008 | Fowler | | 709/229 |
| 2008/0163369 A1* | 7/2008 | Chang et al. | | 726/22 |
| 2009/0300739 A1* | 12/2009 | Nice et al. | | 726/6 |
| 2009/0300768 A1* | 12/2009 | Krishnamurthy et al. | | 726/26 |
| 2010/0031022 A1* | 2/2010 | Kramer | | 713/155 |
| 2010/0275024 A1* | 10/2010 | Abdulhayoglu | | 713/175 |

OTHER PUBLICATIONS

Sujata, Garera; A Framework for Detection and Measurement of Phishing Attacks; Nov. 2, 2007; Jphn Hopkins University; pp. 1-8.*
Dhamija, Rachna et al., "The Battle Against Phishing: Dynamic Security Skins." Year: 2005.

* cited by examiner

Primary Examiner — Mohammad W Reza
Assistant Examiner — Monjour Rahim
(74) Attorney, Agent, or Firm — Blakely, Sokoloff, Taylor & Zafman LLP

(57) ABSTRACT

System and method for facilitating user authentication of web page content are described. In one embodiment, the method comprises receiving a request from a web browser for web page content; and responsive to receipt of the request, providing to the web browser the requested web page content and associated digitally signed content; wherein prior to display of the web page content by the web browser, the digitally signed content is evaluated by a plug-in portion of the web browser to determine whether the digitally signed content is verified, indicating that a provider of the web page content is trustworthy.

14 Claims, 2 Drawing Sheets

SYSTEM AND METHOD FOR FACILITATING USER AUTHENTICATION OF WEB PAGE CONTENT

BACKGROUND

There is growing concern among individuals in the United States and abroad about identity theft, as well as misuse of personal information. Businesses are similarly concerned about fraud and theft. The increasing automation of business transactions has removed many of the cues people use to make judgments about the trustworthiness of entities with whom they deal. Interestingly, the same technology that enables remotely situated entries to transact business with one another also enables unauthorized or fraudulent transactions to occur more quickly and in more places than before. On the other hand, the transaction speed that magnifies losses in the event of fraud also magnifies gains in legitimate transactions. Speed and convenience are selling points for each wave of automation and for most individuals and businesses, the gains have been substantial enough to outweigh the increased risks and the occasional losses involved.

One way to reduce the risk of loss is to use a reputation-based system. Currently, many businesses and organizations either self-assert that they are trustworthy and have secure practices or they display icons or "seals" on their web page that purport to be proof that they are in the good graces of some trusted third party, such as Better Business Bureau, TRUSTe, Verisign, and others. Unfortunately, it is not difficult to forge or "spoof" such seals; moreover, most existing security indicators are displayed along the periphery of a browser window, such as on the tool bar or status bar, and thus outside the primary focus of the user, thereby increasing the probability that attempts to deceive the user into believing that the spoofed seal is in fact valid will succeed.

SUMMARY

In one embodiment, a method for facilitating user authentication of web page content is disclosed. The method comprises receiving a request from a web browser for web page content; and responsive to receipt of the request, providing to the web browser the requested web page content and associated digitally signed content; wherein prior to display of the web page content by the web browser, the digitally signed content is evaluated by a plug-in portion of the web browser to determine whether the digitally signed content is verified, indicating that a provider of the web page content is trustworthy.

DETAILED DESCRIPTION

As will be described in greater detail below, in one embodiment, a custom plug-in for a web browser is installed on a web client for facilitating user authentication of web page content. As part of the installation process, the user is guided through a process of selecting one or more "adornments" for display in connection with web page reputation information, such as seals. As will be described, the selected adornments, together with dynamic content received from a web content server, serve as the basis for a personalized proof representation. Adornments may include still images and/or video images stored locally on the user's computer or located via an online image search. Furthermore, adornments may comprise a one-time generated image, a base image plus an image that is dynamically generated on a per-invocation basis, and/or some combination of the foregoing. The primary consideration in selecting an appropriate adornment should be to select one that would be difficult for a third party to spoof.

On the server side, a server administrator makes arrangements for providing to users either a static digitally signed block of content or a digitally signed content stream identifier (hereinafter collectively referred to as "digitally signed content") in connection with a web page. One of any number of known methodologies for digitally signing content may be employed to create the necessary digitally signed content. Within the web page, the web designer leaves space for a seal plus an adornment, the application for display is set to the plug-in, and the input is the digitally signed content.

Figure 1:
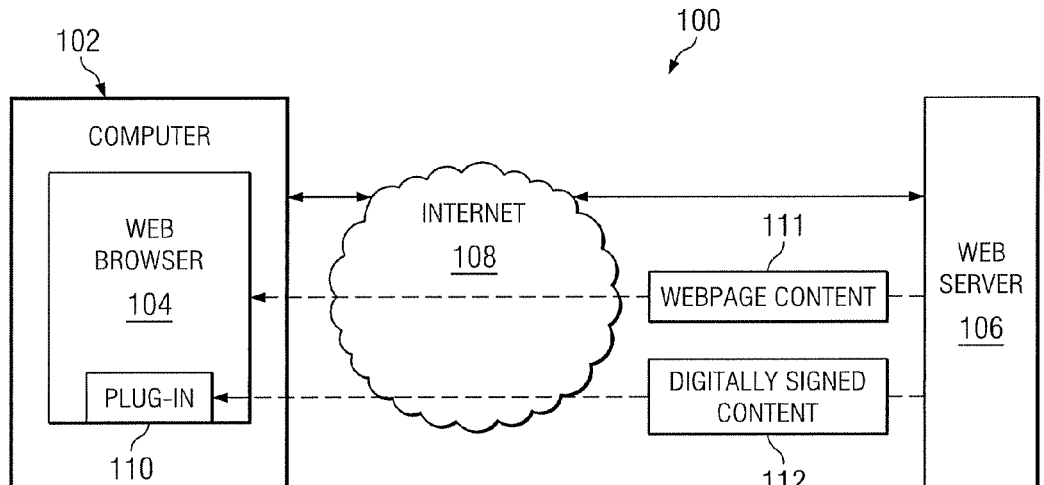
FIG. 1 is a block diagram of a system for facilitating user authentication of web page content in accordance with one embodiment.

FIG. 1 illustrates system 100 for facilitating user authentication of web page content in accordance with one embodiment. As shown in FIG. 1, the system 100 comprises a computer 102 having installed thereon a web browser 104 for accessing content, typically in the form of web pages, from a web server 106 of a website provider via an Internet connection 108. In accordance with features of one embodiment, the web browser 104 includes a custom plug-in 110 for evaluating digitally signed content 112 provided by the web server to make a trust determination regarding the website provider. In this regard, it will be recognized that the fact that a digital signature is authentic (i.e., not forged) does not automatically imply that the content associated therewith should be trusted; hence, the trust determination is necessary. For example, content having a digital signature of X indicates only that the content was sent by X; a determination must still be made by the recipient whether X is an entity that can be trusted by the recipient.

Figure 2:
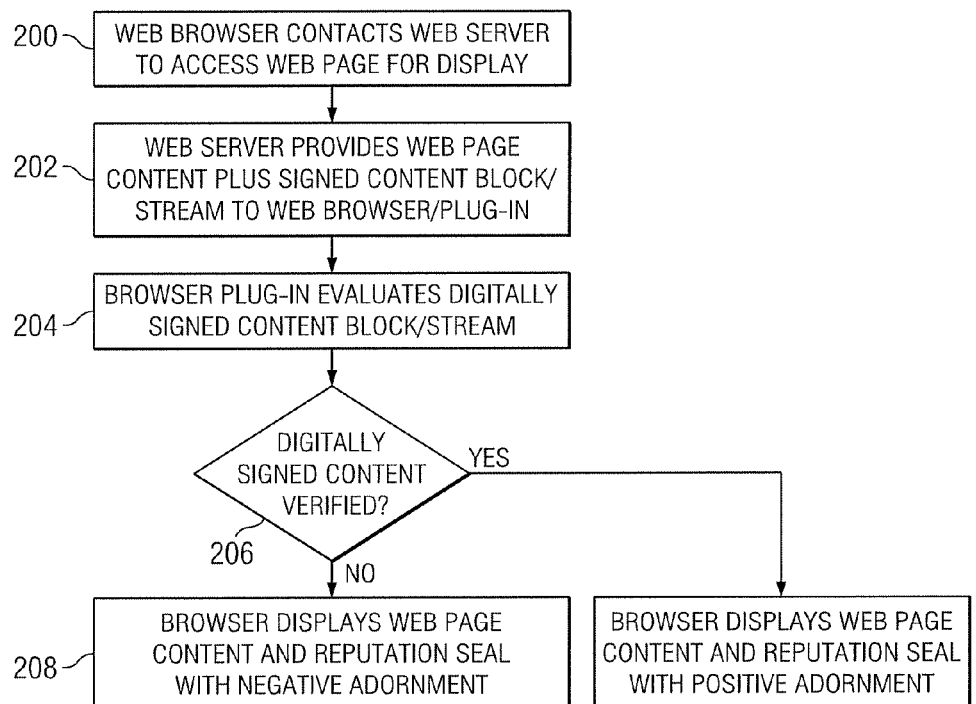
FIG. 2 is a flowchart illustrating operation of a system for facilitating user authentication of web page content in accordance with one embodiment.
Figure 3A:
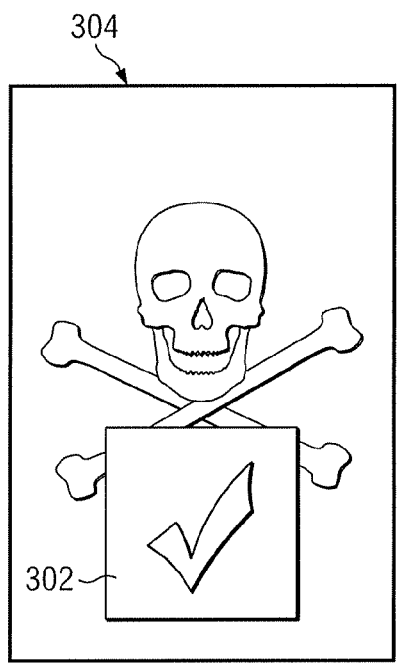
FIG. 3A illustrates an exemplary combination of a reputation seal with a negative adornment in accordance with one embodiment.
Figure 3B:
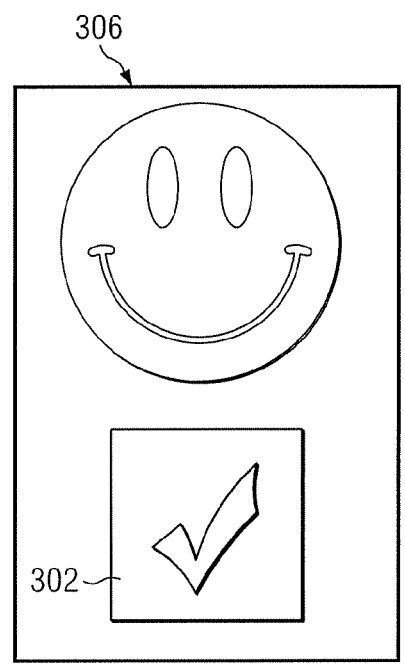
FIG. 3B illustrates an exemplary combination of a reputation seal with a positive adornment in accordance with one embodiment.

FIG. 2 is a flowchart illustrating operation of the system 100 (FIG. 1) in accordance with one embodiment. Referring to FIG. 2, in step 200, responsive to a user's request, the web browser 104 contacts the web server 106 to access content, such as a web page, for display on the computer 102. In step 202, the web server 106 provides the requested web page content, as well as the digitally signed content 112, to the web browser 104 and plug-in 110. In step 204, the plug-in 110 evaluates the digitally signed content 112. In step 206, a determination is made whether the digitally signed content is verified; that is, whether a positive trust determination has been made. If not, execution proceeds to step 208, in which the browser 104 displays the web page and reputation seal with a negative adornment. FIG. 3A illustrates an exemplary combination of a reputation seal 302 with a negative adornment 304. If in step 206 it is determined that the digitally signed content is verified, execution proceeds to step 210, in which the browser 104 displays the web page and reputation seal with a positive adornment. FIG. 3B illustrates a combination of the reputation seal 302 with a positive adornment 306.

It will be recognized that, although in FIGS. 3A and 3B, the adornments are shown as surrounding (or as background to)

the reputation seal, other combinations of adornments and seals are contemplated. Examples include, but are not limited to:

- display of a user-selected image/visual effect in the content space of the browser window
- display of a user-selected image/visual effect adjacent to the seal (i.e., above, below, or to either side)
- display of a user-selected image/visual effect surrounding the seal
- watermarking the user-selected image with the seal or vice versa
- combining user-selected images/visual effects to create an adornment
- combining a user-selected image with results of a trust determination
- display of the seal at a particular position or time within the window, as designated by the user
- animating the seal itself (e.g., spinning at a selected rate, bouncing in a particular pattern, floating up/down on a scale)
- animating the adornment
- combining seal methods
- displaying a scaled version of a user-selected image/visual effect outside the content space (e.g., a toolbar or status bar)

It will be further recognized that video images may also be used as adornments in connection with the above-described applications.

It is understood that several modifications, changes and substitutions are intended in the foregoing disclosure and in some instances some features of the embodiments will be employed without a corresponding use of other features. Accordingly, it is appropriate that the appended claims be construed broadly and in a manner consistent with the scope of the embodiments described herein.

What is claimed is:

1. A non-transitory machine-readable medium having instructions stored therein, which when executed by a processor, cause the processor to perform a method for facilitating user authentication of web page content, the method comprising:
   - requesting, by a browser, a web server to provide web page content to a client;
   - receiving the requested web page content from the web server;
   - receiving digitally signed content associated with the web page content from the web server, wherein the digitally signed content is separate content from the requested web page content;
   - evaluating, by a browser plug-in associated with the browser, the digitally signed content to determine whether the digitally signed content is verified, indicating that a provider of the web page content is trustworthy;
   - selecting a first adornment in response to determining that the provider of the web page content is trustworthy, wherein the first adornment visually indicates the provider of the web page content is trustworthy;
   - selecting a second adornment in response to determining that the provider of the web page content is not trustworthy, wherein the second adornment visually indicates the provider of the web page content is not trustworthy, wherein at least one of the first adornment and second adornment comprises at least one of still image selected by the user, a visual effect selected by the user, and a video image selected by the user;
   - generating a graphical representation having the selected adornment and a reputation seal; and
   - displaying the web page content including the graphical representation, wherein the adorned reputation seal is displayed in a user-designated area of the web page content.

2. The medium of claim 1 wherein the first adornment is a positive adornment, the method further comprising, responsive to the digitally signed content being verified, displaying the web page content with a positively adorned reputation seal.

3. The medium of claim 1 wherein the second adornment is a negative adornment, the method further comprising, responsive to the digitally signed content not being verified, displaying the web page content with a negatively adorned reputation seal.

4. The medium of claim 1 wherein at least one of the first adornment and second adornment comprises animating at least one of the seal and an image selected by the user displayed in connection with the seal.

5. A method for facilitating user authentication of web page content, the method comprising:
   - requesting, by a browser executed by a processor, a web server to provide web page content to a client;
   - receiving the requested web page content from the web server;
   - receiving digitally signed content associated with the web page content from the web server, wherein the digitally signed content is separate content from the requested web page content;
   - evaluating, by a browser plug-in associated with the browser, the digitally signed content to determine whether the digitally signed content is verified, indicating that a provider of the web page content is trustworthy;
   - selecting a first adornment in response to determining that the provider of the web page content is trustworthy, wherein the first adornment visually indicates the provider of the web page content is trustworthy;
   - selecting a second adornment in response to determining that the provider of the web page content is not trustworthy, wherein the second adornment visually indicates the provider of the web page content is not trustworthy, wherein at least one of the first adornment and second adornment comprises at least one of still image selected by the user, a visual effect selected by the user, and a video image selected by the user;
   - generating a graphical representation having the selected adornment and a reputation seal; and
   - displaying the web page content including the graphical representation, wherein the adorned reputation seal is displayed in a user-designated area of the web page content.

6. The method of claim 5 further comprising, prior to the requesting, installing on the client the browser plug-in for performing the evaluating.

7. The method of claim 5 further comprising, during the installing, prompting the user to select the first and second adornments for display in connection with the reputation seal.

8. The method of claim 5 wherein the first adornment is a positive adornment.

9. The method of claim 5 wherein the second adornment is a negative adornment.

10. The method of claim 5 wherein at least one of the first adornment and second adornment comprises animating at least one of the seal and an image selected by the user displayed in connection with the seal.

11. A system for facilitating user authentication of web page content, the system comprising:
a processor; and
a memory coupled to the processor for storing instructions, which when executed from the memory, cause the processor to
request a web server to provide web page content to a client,
receive the requested web page content from the web server,
receive digitally signed content associated with the web page content from the web server, wherein the digitally signed content is separate content from the requested web page content,
evaluate, by a browser plug-in associated with the browser, the digitally signed content to determine whether the digitally signed content is verified, indicating that a provider of the web page content is trustworthy,
select a first adornment in response to determining that the provider of the web page content is trustworthy, wherein the first adornment visually indicates the provider of the web page content is trustworthy,
select a second adornment in response to determining that the provider of the web page content is not trustworthy, wherein the second adornment visually indicates the provider of the web page content is not trustworthy, wherein at least one of the first adornment and second adornment comprises at least one of still image selected by the user, a visual effect selected by the user, and a video image selected by the user,
generate a graphical representation having the selected adornment and a reputation seal, and
display the web page content including the graphical representation, wherein the adorned reputation seal is displayed in a user-designated area of the web page content.

12. The system of claim 11 wherein the first adornment is a positive adornment and, responsive to the digitally signed content being verified, the web page content is displayed with a positively adorned reputation seal.

13. The system of claim 11 wherein the second adornment is a negative adornment and, responsive to the digitally signed content not being verified, the web page content is displayed with a negatively adorned reputation seal.

14. The system of claim 11 wherein at least one of the first adornment and second adornment comprises at least one of a still image selected by the user, a visual effect selected by the user, a video image selected by the user.

* * * * *